(12) United States Patent
Maitland et al.

(10) Patent No.: US 8,650,336 B2
(45) Date of Patent: Feb. 11, 2014

(54) DIRECT MEMORY ACCESS (DMA) DEVICE WITH EVENT MOVER THAT MOVES EVENT FROM EVENT CALENDAR TO EXPIRED EVENT QUEUE WITHOUT MANAGEMENT OF CENTRAL PROCESSING UNIT

(75) Inventors: Roger Maitland, Woodlawn (CA); Hal Ireland, Kanata (CA); Eric Combes, Boisbriand (CA); Kevin Smith, Ottawa (CA)

(73) Assignee: Alcatel Lucent, Paris (FR)

( * ) Notice: Subject to any disclaimer, the term of this patent is extended or adjusted under 35 U.S.C. 154(b) by 1744 days.

(21) Appl. No.: 11/588,384

(22) Filed: Oct. 27, 2006

(65) Prior Publication Data

US 2007/0162646 A1 Jul. 12, 2007

Related U.S. Application Data

(60) Provisional application No. 60/731,344, filed on Oct. 28, 2005.

(51) Int. Cl.
*G06F 13/28* (2006.01)
(52) U.S. Cl.
USPC .......................................................... 710/22
(58) Field of Classification Search
USPC .......................................................... 710/22
See application file for complete search history.

(56) References Cited

U.S. PATENT DOCUMENTS

| | | | |
|---|---|---|---|
| 5,982,749 A * | 11/1999 | Daniel et al. | 370/395.21 |
| 6,981,074 B2 * | 12/2005 | Oner et al. | 710/32 |
| 7,039,177 B1 * | 5/2006 | Smith et al. | 379/355.03 |
| 7,085,229 B1 * | 8/2006 | Potter et al. | 370/231 |
| 7,500,241 B1 * | 3/2009 | Flockhart et al. | 718/102 |
| 2005/0122962 A1 * | 6/2005 | Delaney et al. | 370/352 |

* cited by examiner

*Primary Examiner* — Idriss N Alrobaye
*Assistant Examiner* — Brooke Taylor
(74) *Attorney, Agent, or Firm* — Fay Sharpe LLP

(57) ABSTRACT

The direct memory access device and method of the present invention uses an event calendar, an expired event queue of a fixed size, a calendar scanner, and an event mover. The event calendar stores an event in a linked list. The expired event queue stores an event that has already expired from the event calendar. The calendar scanner automatically scans the event calendar without management by a central processing unit (CPU). The event mover moves an event from the event calendar to the expired event queue without management by the CPU. The method provides for storing the event in the linked list, automatically scanning the event calendar without management by the CPU, moving the event from the event calendar to an expired event queue of a fixed size without management by the CPU, and storing the event that has already expired from the event calendar.

19 Claims, 14 Drawing Sheets

FIG. 4

| | EN-QUEUE DATA | | SET-UP DMA FOR NEXT TRANSFER | | | |
|---|---|---|---|---|---|---|
| | Desc1 | Desc2 | Desc3 | Desc4 | Desc5 | Desc6 |
| SOURCE | &QueueHead | &Data | &QueueHead | &QueueHead | &WrapTable | <SetByDesc3> |
| DESTINATION | Desc2.dest | <SetByDesc1> | Desc6.src | Desc5.src | Desc6.src | &QueueHead |
| NEXT DESCRIPTOR | Desc2.src | Desc3.src | Desc4.src | Desc5.src | Desc6.src | NextDesc.scr |
| LENGTH | 4 | 12 | 4 | 1 | 1 | 4 |
| | ↳ 82 | ↳ 84 | ↳ 86 | ↳ 88 | ↳ 90 | ↳ 92 |

WRAP TABLE

120

|  |  | NOT-USED | | |
|---|---|---|---|---|
|  | 0x0 | 0x4 | 0x8 | 0xC |
| 0xE0000000 | 0x0000000C | 0x00000000 | 0x00000000 | 0x00000000 |
| 0xE0000010 | 0x0000001C | 0x00000000 | 0x00000000 | 0x00000000 |
| 0xE0000020 | 0x0000002C | 0x00000000 | 0x00000000 | 0x00000000 |
| 0xE0000030 | 0x0000003C | 0x00000000 | 0x00000000 | 0x00000000 |
| 0xE0000040 | 0x0000004C | 0x00000000 | 0x00000000 | 0x00000000 |
| 0xE0000050 | 0x0000005C | 0x00000000 | 0x00000000 | 0x00000000 |
| 0xE0000060 | 0x0000006C | 0x00000000 | 0x00000000 | 0x00000000 |
| 0xE0000070 | 0x0000007C | 0x00000000 | 0x00000000 | 0x00000000 |
| 0xE0000080 | 0x0000008C | 0x00000000 | 0x00000000 | 0x00000000 |
| 0xE0000090 | 0x0000009C | 0x00000000 | 0x00000000 | 0x00000000 |
| 0xE00000A0 | 0x000000AC | 0x00000000 | 0x00000000 | 0x00000000 |
| 0xE00000B0 | 0x000000BC | 0x00000000 | 0x00000000 | 0x00000000 |
| 0xE00000C0 | 0x000000CC | 0x00000000 | 0x00000000 | 0x00000000 |
| 0xE00000D0 | 0x000000DC | 0x00000000 | 0x00000000 | 0x00000000 |
| 0xE00000E0 | 0x000000EC | 0x00000000 | 0x00000000 | 0x00000000 |
| 0xE00000F0 | 0x000000FC | 0x00000000 | 0x00000000 | 0x00000000 |

WRAP TABLE

FIG. 8

| | ENQUEUE DATA | | SETUP DMA FOR NEXT TRANSFER | | | |
|---|---|---|---|---|---|---|
| | Desc1 | Desc2 | Desc3 | Desc4 | Desc5 | Desc6 |
| SOURCE | 0xD0000000 | &Data | 0xD0000000 | 0xD0000000 | 0xE0000000 | ⟨SetByDesc3⟩ |
| DESTINATION | Desc2.dest | 0xF0000000 | Desc6.src | Desc5.src | Desc6.src | 0xD0000000 |
| NEXT DESCRIPTOR | Desc2.src | Desc3.src | Desc4.src | Desc5.src | Desc6.src | NextDesc.scr |
| LENGTH | 4 | 12 | 4 | 1 | 1 | 4 |
| | ↙82 | ↙84 | ↙86 | ↙88 | ↙90 | ↙92 |

FIG. 9

EXPIRED EVENT QUEUE

16

(FOURTH FIELD) 108

|  | 0x0 | 0x4 | 0x8 | 0xC |
|---|---|---|---|---|
| 0xF0000000 | 0x01234567 | 0x89ABCDEF | 0x01234567 | 0xF0000010 |
| 0xF0000010 |  |  |  | 0xF0000020 |
| 0xF0000020 |  |  |  | 0xF0000030 |
| 0xF0000030 |  |  |  | 0xF0000040 |
| 0xF0000040 |  |  |  | 0xF0000050 |
| 0xF0000050 |  |  |  | 0xF0000060 |
| 0xF0000060 |  |  |  | 0xF0000070 |
| 0xF0000070 |  |  |  | 0xF0000000 |

(CURRENT ENTRY) 104

| | ENQUEUE DATA | | | SETUP DMA FOR NEXT TRANSFER | | | |
|---|---|---|---|---|---|---|---|
| | Desc1 | Desc2 | Desc3 | Desc4 | Desc5 | Desc6 |
| SOURCE | 0xD0000000 | &Data | 0xD0000000 | 0xD0000000 | 0xE0000000 | 0xF000000C |
| DESTINATION | Desc2.dest | 0xF0000000 | Desc6.src | Desc5.src | Desc6.src | 0xD0000000 |
| NEXT DESCRIPTOR | Desc2.src | Desc3.src | Desc4.src | Desc5.src | Desc6.src | NextDesc.scr |
| LENGTH | 4 | 12 | 4 | 1 | 1 | 4 |
| | ↳82 | ↳84 | ↳86 | ↳88 | ↳90 | ↳92 |

| | ENQUEUE DATA | | | SETUP DMA FOR NEXT TRANSFER | | | |
|---|---|---|---|---|---|---|---|
| | Desc1 | Desc2 | Desc3 | Desc4 | Desc5 | Desc6 |
| SOURCE | 0xD0000000 | &Data | 0xD0000000 | 0xD0000000 | 0xE0000000 | ⟨SetByDesc3⟩ |
| DESTINATION | Desc2.dest | 0xF0000070 | Desc6.src | Desc5.src | Desc6.src | 0xD0000000 |
| NEXT DESCRIPTOR | Desc2.src | Desc3.src | Desc4.src | Desc5.src | Desc6.src | NextDesc.scr |
| LENGTH | 4 | 12 | 4 | 1 | 1 | 4 |
| | ↳82 | ↳84 | ↳86 | ↳88 | ↳90 | ↳92 |

EXPIRED EVENT QUEUE    (FOURTH FIELD) 108

| | 0x0 | 0x4 | 0x8 | 0xC |
|---|---|---|---|---|
| 0xF0000000 | 0x01234567 | 0x89ABCDEF | 0x01234567 | 0xF0000010 |
| 0xF0000010 | | | | 0xF0000020 |
| 0xF0000020 | | | | 0xF0000030 |
| 0xF0000030 | | | | 0xF0000040 |
| 0xF0000040 | | | | 0xF0000050 |
| 0xF0000050 | | | | 0xF0000060 |
| 0xF0000060 | | | | 0xF0000070 |
| 0xF0000070 | 0x12312312 | 0x12312312 | 0x12312312 | 0xF0000000 |

(LAST ENTRY) 109

FIG. 15

| | ENQUEUE DATA | | | SETUP DMA FOR NEXT TRANSFER | | |
|---|---|---|---|---|---|---|
| | Desc1 | Desc2 | Desc3 | Desc4 | Desc5 | Desc6 |
| SOURCE | 0xD0000000 | &Data | 0xD0000000 | 0xD0000000 | 0xE0000000 | 0xF0000070 |
| DESTINATION | Desc2.dest | 0xF0000070 | Desc6.src | Desc5.src | Desc6.src | 0xD0000000 |
| NEXT DESCRIPTOR | Desc2.src | Desc3.src | Desc4.src | Desc5.src | Desc6.src | NextDesc.scr |
| LENGTH | 4 | 12 | 4 | 1 | 1 | 4 |
| | 82 | 84 | 86 | 88 | 90 | 92 |

| | ENQUEUE DATA | | | SETUP DMA FOR NEXT TRANSFER | | |
|---|---|---|---|---|---|---|
| | Desc1 | Desc2 | Desc3 | Desc4 | Desc5 | Desc6 |
| SOURCE | 0xD0000000 | &Data | 0xD0000000 | 0xD0000000 | 0xE0000000 | 0xF0000070 |
| DESTINATION | Desc2.dest | 0xF0000070 | Desc6.src | Desc5.src | Desc6.src | 0xD0000000 |
| NEXT DESCRIPTOR | Desc2.src | Desc3.src | Desc4.src | Desc5.src | Desc6.src | NextDesc.scr |
| LENGTH | 4 | 12 | 4 | 1 | 1 | 4 |
| | 82 | 84 | 86 | 88 | 90 | 92 |

|  | ENQUEUE DATA | | SETUP DMA FOR NEXT TRANSFER | | |
|---|---|---|---|---|---|
|  | Desc1 | Desc2 | Desc3 | Desc4 | Desc5 | Desc6 |
| SOURCE | 0xD0000000 | &Data | 0xD0000000 | 0xD0000000 | 0xE0000070 | 0xF000007C |
| DESTINATION | Desc2.dest | 0xF0000070 | Desc6.src | Desc5.src | Desc6.src | 0xD0000000 |
| NEXT DESCRIPTOR | Desc2.src | Desc3.src | Desc4.src | Desc5.src | Desc6.src | NextDesc.scr |
| LENGTH | 4 | 12 | 4 | 1 | 1 | 4 |
|  | 82 | 84 | 86 | 88 | 90 | 92 |

| SOURCE | POINTER TO THE ADDRESS OF THE FIRST DESCRIPTOR OF THE FIRST EVENT OF THE NEXT TIME SLOT |
|---|---|
| DESTINATION | START DESCRIPTOR |
| NEXT DESCRIPTOR | ADDRESS OF THE LAST MAINTENANCE DESCRIPTOR |
| LENGTH | 4 (BYTES) |

FIG. 19

| SOURCE | POINTER TO THE ADDRESS OF THE FIRST MAINTENANCE DESCRIPTOR OF THE NEXT TIME SLOT |
|---|---|
| DESTINATION | POINTER TO THE SOURCE ADDRESS OF THE FIRST MAINTENANCE DESCRIPTOR OF THE CURRENT TIME SLOT |
| NEXT DESCRIPTOR | NULL [DMA IMPLEMENTATION DEPENDENT] |
| LENGTH | 4 (BYTES) |

DIRECT MEMORY ACCESS (DMA) DEVICE WITH EVENT MOVER THAT MOVES EVENT FROM EVENT CALENDAR TO EXPIRED EVENT QUEUE WITHOUT MANAGEMENT OF CENTRAL PROCESSING UNIT

RELATED APPLICATION

The present patent application claims the benefit of U.S. Provisional Patent Application Ser. No. 60/731,344, entitled "DMA Based Timer Subsystem", and filed on Oct. 28, 2005, the entire contents of which are incorporated herein by reference.

FIELD OF THE INVENTION

The present invention relates generally to a direct memory access device and more specifically to a direct memory access device based on a timer system.

BACKGROUND

Event timers have been implemented in most computing systems. Examples are timers which wait a second for an acknowledgement of a message sent to another computer. Although common, event timers require that the central processing unit (CPU) directly manage the events. As a result, the CPU becomes occupied with monitoring the timing of events. Periodically the event timers interrupt the CPU. High precision with these event timers requires large amounts of CPU time, since the amount of time required for the CPU to handle events is proportional to the precision of the events. Thus, computing systems have been unable to provide high capacity and high precision. Also, many general purpose operating systems have been unable to rapidly switch tasks, making it difficult for the CPU to keep up with events.

For the foregoing reasons, there is a need for an event timer that allows computing systems with or without an operating system to have high capacity, real time, event handling capabilities, without management by the CPU, with the hardware that is often already available on the system.

SUMMARY OF THE INVENTION

The present invention is directed to a direct memory access device (DMA) that satisfies this need.

In one aspect of the present invention, there is provided a DMA for timing events comprising an event calendar, an expired event queue of a fixed size, a calendar scanner, and an event mover. The event calendar stores an event in a linked list. The expired event queue stores an event that has already expired from the event calendar. The calendar scanner automatically scans the event calendar without management by a CPU. The event mover moves an event from the event calendar to the expired event queue without management by the CPU.

In another aspect, there is provided a method of configuring a DMA for timing events. The method comprises storing an event in a linked list using an event calendar, automatically scanning the event calendar using a calendar scanner without management by a CPU, moving the event from the event calendar to an expired event queue of a fixed size using an event mover without management by the CPU, and storing an event that has already expired from the event calendar using the expired event queue.

In another aspect, there is provided a system for timing events comprising a direct memory access device coupled to a CPU. The CPU is configured to perform the steps identified in the method described above.

In yet another aspect, there is provided a computer readable medium on which is stored a set of instructions for timing events. When the instructions are executed, they perform the steps identified in the method described above.

Other aspects and features of the present invention will become apparent, to those ordinarily skilled in the art, upon review of the following description of the specific embodiments of the invention.

BRIEF DESCRIPTION OF THE DRAWINGS

FIG. 4 depicts an event according to an exemplary embodiment;

FIG. 7 depicts a wrap table according to an exemplary embodiment;

FIG. 8 depicts an event being processed according to an exemplary embodiment;

FIG. 9 depicts an expired event queue storing an expired event according to an exemplary embodiment;

FIG. 12 is similar to FIG. 11 but depicting the event further in processing;

FIG. 13 is similar to FIG. 12 but depicting the event further in processing;

FIG. 14 depicts an expired event queue storing an expired event according to an exemplary embodiment;

FIG. 15 is similar to FIG. 13 but depicting the event further in processing;

FIG. 16 is similar to FIG. 15 but depicting the event further in processing;

FIG. 17 is similar to FIG. 16 but depicting the event further in processing;

FIG. 18 depicts a first maintenance descriptor according to an exemplary embodiment; and FIG. 19 depicts a last maintenance descriptor according to an exemplary embodiment.

The invention will now be described in greater detail with reference to the accompanying diagrams, in which:

DETAILED DESCRIPTION OF THE PREFERRED EMBODIMENTS

Figure 1:
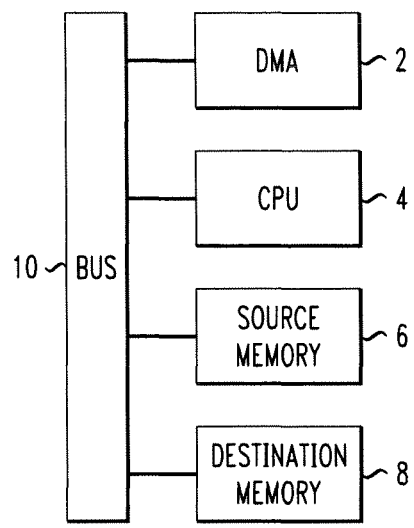
FIG. 1 is a block diagram of a conventional computer system using a direct memory access device.

FIG. 1 is a block diagram of a conventional computer system using a direct memory access device (DMA) 2 coupled to a central processing unit (CPU) 4 for transferring data from a source memory 6 to a destination memory 8 through a bus 10. Alternatively, source memory 6 and destination memory 8 may be the same physical memory device, in which case DMA 2 could transfer data from one location on the memory device to another location.

DMA 2 is a piece of computer hardware that is specifically designed to transfer blocks of data from one location in memory to another, independent of the computer's CPU.

To program DMA 2, CPU 4 typically programs a source address field, a destination address field, and a length field in bytes on DMA 2. Together, these parameters are known as a descriptor. Processing a descriptor transfers data, copying a number of bytes having the length specified in the length field, from the address in memory specified as the source address, to the address in memory specified as the destination address. Descriptors are stored in the same memory area as the data to be manipulated on by the DMA.

One capability of many DMAs is to chain descriptors together. This is typically used to gather memory from many distinctive regions into one region. To chain descriptors together, the CPU programs an added field, referred to as the next pointer. The next pointer is the address of the following descriptor in a chain of descriptors. Indicating the end of the chain can be done in various ways, such as setting the next pointer or the length field of the last descriptor in the chain to zero.

Figure 2:
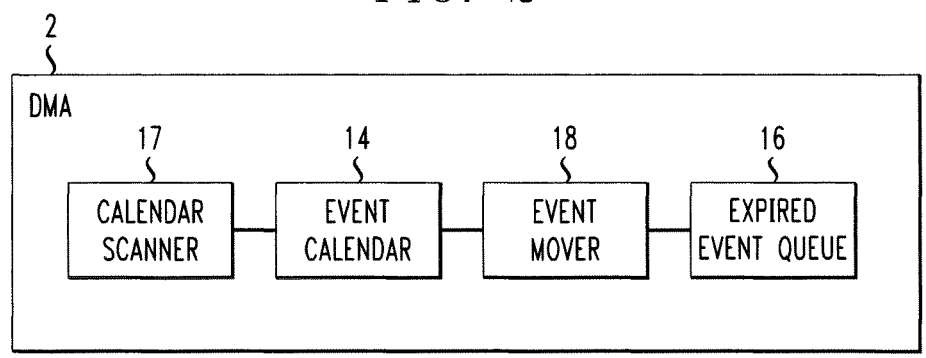
FIG. 2 is a block diagram illustrating an overview of the present invention.

Referring to FIG. 2, in one aspect of the present invention there is provided a DMA 2 for timing events comprising an event calendar 14 for storing events, an expired event queue 16 of a fixed size for storing events that have already expired from event calendar 14, a calendar scanner 17 for automatically scanning event calendar 14 without management by CPU 4, and an event mover 18 for moving the event from event calendar 14 to expired event queue 16 without management by CPU 4.

Figure 3:
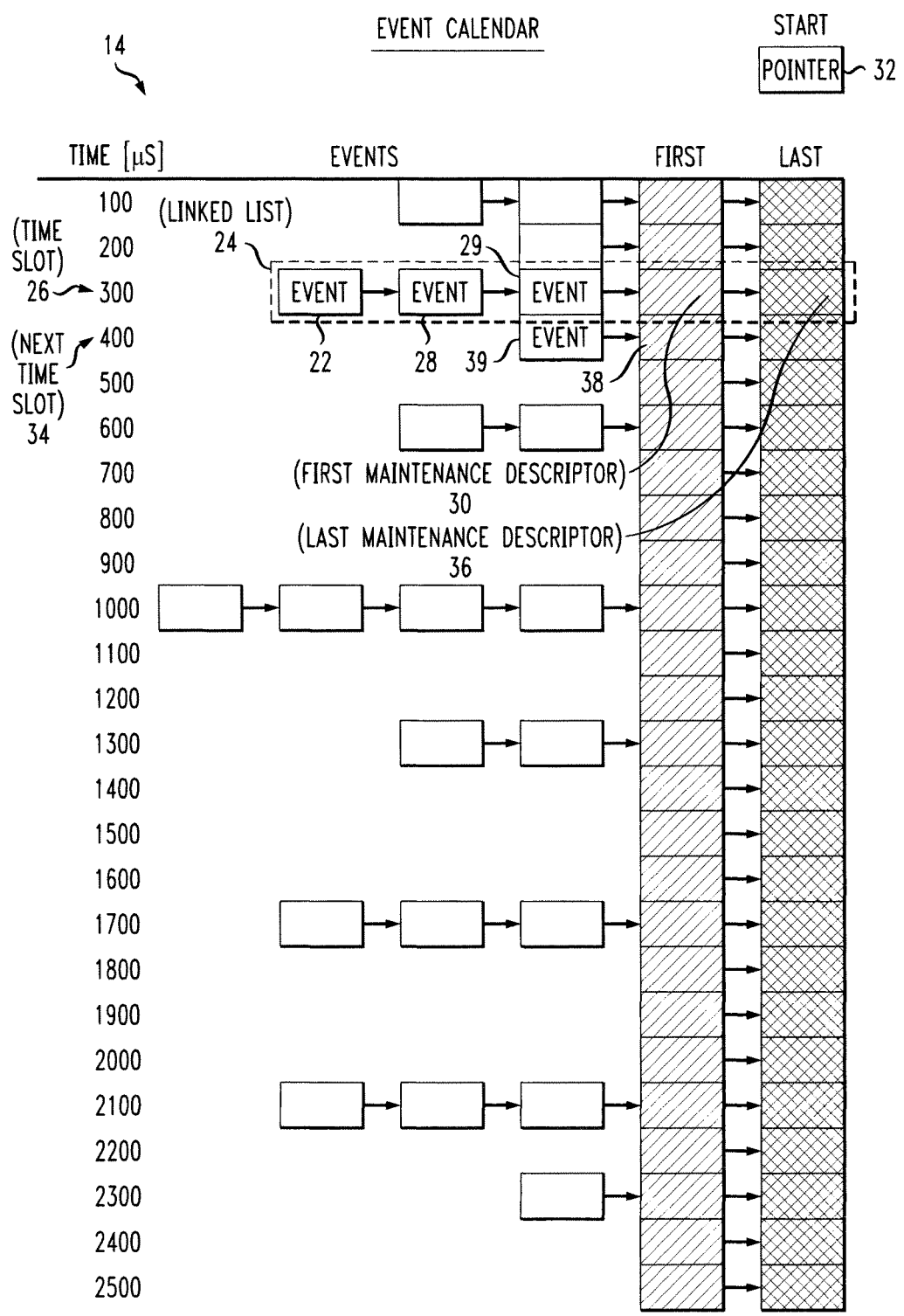
FIG. 3 depicts an event calendar according to an exemplary embodiment.

Event calendar 14 is programmed on DMA 2. In some embodiments, expired event queue 16 is stored in destination memory 8. FIG. 3 depicts event calendar 14 for storing events, such as event 22, in a linked list 24. Optionally, linked list 24 is indexed by time. Calendar scanner 17 of FIG. 2 is depicted as a start pointer 32, a first maintenance descriptor 30, and a last maintenance descriptor 36. Calendar scanner 17 may be programmed on DMA 2.

Scheduling an event works as follows. When CPU 4 needs an event to occur sometime in the future, it calculates the required delay for the event. The CPU calls a function, referred to as an event handler, to insert the event into event calendar 14. The event handler uses the delay value passed to it and the current time to calculate a time slot in which the event will be scheduled. The event handler inserts the event 22 into the linked list 24 associated with time slot 26, immediately preceding any other events 28 in linked list 24, so that event 22 is also the first event 22 in linked list 24. Alternatively, the order of events within linked list 24 may be random, or events may be so arranged so that inserting an event is done as efficiently as possible to minimize CPU consumption. The event handler also updates an entry in linked list 24, which is first maintenance descriptor 30, as detailed further below.

In general, processing events in a linked list works as follows. DMA 2 initiates processing based on an internal periodic timer. If DMA 2 lacks this capability, it can be simulated using software based on the CPU's timers. Such simulation can be efficient on CPU consumption. DMA 2 is programmed with a pointer to the first event in the linked list, so as to know where to start processing. DMA 2 processes events, thereby transferring data, and continues along the linked list until it reaches a stop condition. As the timer is periodic, this operation can be programmed to happen at a specific interval.

More specifically, after initiating processing, DMA 2 refers to its pointer, which is start pointer 32, to know where to start processing. Start pointer 32 points to the first event of the next time slot. DMA 2 processes the first event 22, which instructs DMA 2 to transfer data to expired event queue 16. DMA 2 then processes the next entry in the linked list, transferring more data. After processing each event in linked list 24 accordingly, DMA 2 reaches the two last entries. These two entries maintain the linked list, like start pointer 32, preparing DMA 2 to process the linked list of the next time slot 34. The before-last entry, first maintenance descriptor 30, points to the first event of the linked list of a next time slot. Moreover, first maintenance descriptor 30 instructs DMA 2 to update start pointer 32 to point to the first event 39 of next time slot 34. DMA 2 then processes the next entry in the linked list, which is last maintenance descriptor 36. Last maintenance descriptor 36 instructs DMA 2 to update first management descriptor 30 of current time slot 26 to point to first maintenance descriptor 38 of next time slot 34. This has the effect of erasing the events that have already expired from the event calendar, namely events, 22, 28, and 29, as well as resetting linked list 24. As such, when DMA 2 wraps around event calendar 14, DMA 2 can reuse linked list 24 or proceed down to next time slot 34, without CPU intervention. Finally, last maintenance descriptor 36 instructs DMA 2 to stop processing. Processing starts again when the timer next initiates DMA 2. When it next initiates DMA 2, DMA 2 refers to start pointer 32, which points to first event 39 of time slot 34.

The maximum length of the linked list can be fixed, so that the time required for the DMA to process all events in the linked list does not exceed the duration of the periodic timer. If it exceeds the duration of the timer, precision may be compromised. However, some DMAs cope with this by immediately starting on the next time slot.

The events in event calendar 14 can be of several types. The least complex would be a simple copy of data from one memory location to another, including a copy from memory to the registers of a device accessible to the CPU. A more complex type could be a message intended for autonomous retransmission, for example due to missing acknowledgements, as required by assured transmission protocols. Again, this too can be implemented as a memory copy. Another complex type is an event which requires software intervention where the event must be stored in a queue such that the software can process it. An extension to this last type is the queuing of event that requires immediate processing, which involves adding the event to a queue and interrupting the software to take immediate action. This last use would enable non-real-time operating systems, such as Windows™ or Linux™, to have hard-real-time behavior limited only by interrupt latency. All of the queuing required with the software involved options can be handled with expired event queue 16 autonomously by DMA 2.

Each type of event in the system may have its own expired event queue with no overhead other than 4 bytes of memory per queue entry.

Event mover 18 of FIG. 2 is depicted in the following Figures as a queue head pointer, a wrap table for locating the next entry in the expired event queue, and an event comprising a plurality of chained descriptors. In some embodiments, the wrap table is stored in memory, such as source memory 6 or destination memory 8.

Referring to FIG. 4, in some embodiments of the present invention, each event in event calendar 14 is composed of a chain 80 of six descriptors.

The first two descriptors, namely first descriptor 82 and second descriptor 84, are responsible for transferring data to expired event queue 16. Moreover, they form a moving set of descriptors for moving an event that has already expired from the event calendar to the current entry in the expired event queue. Alternatively, a single descriptor may be used to move an event.

Figure 5:
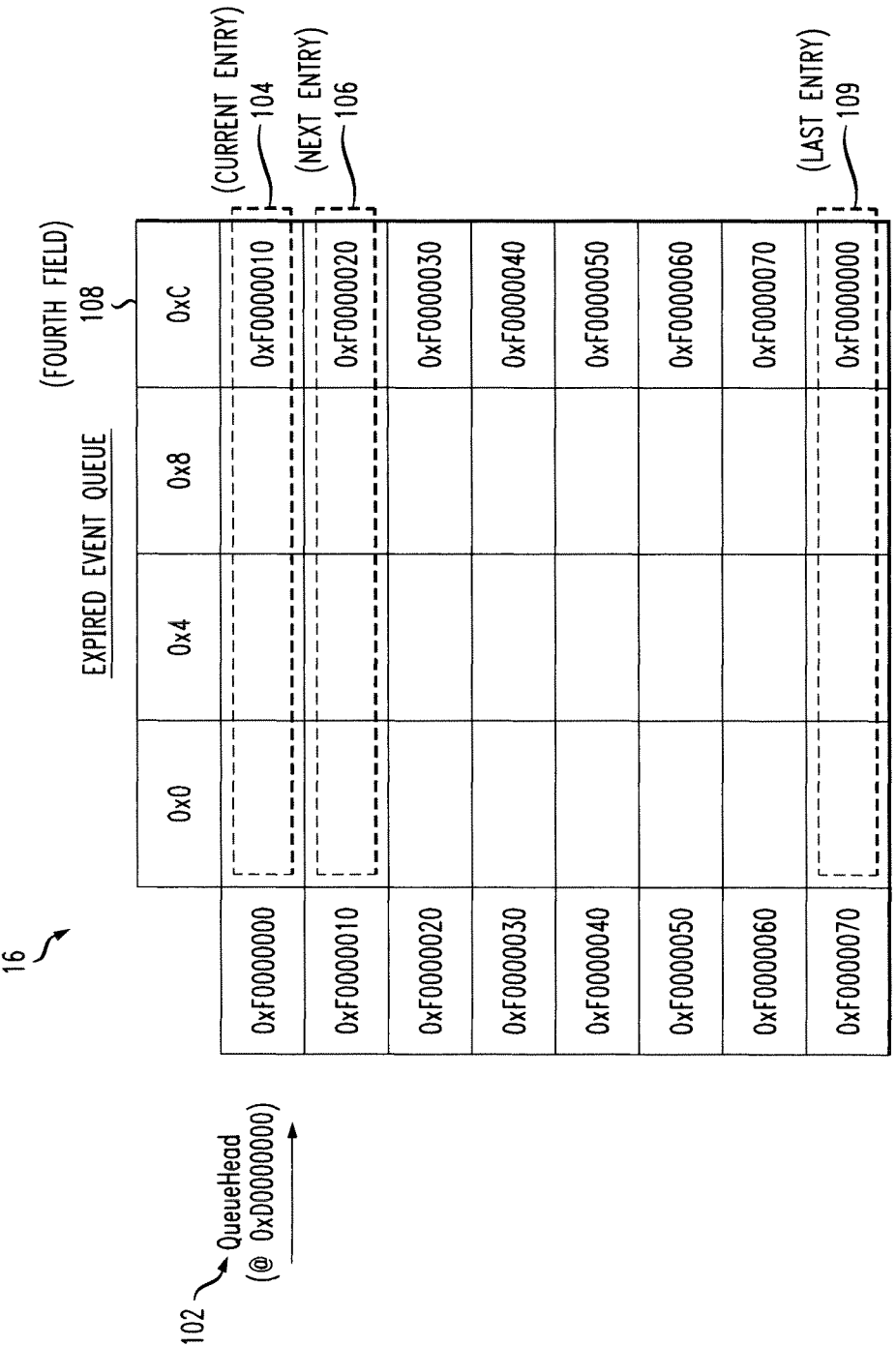
FIG. 5 depicts an expired event queue according to an exemplary embodiment.

Referring to FIG. 5, expired event queue 16 has a queue head pointer 102 for indicating the current entry 104 in expired event queue 16 to which an expired event is to be moved. Although expired event queue 16 is of a fixed size, it may be implemented as a pointer to variable sized events. Once the two descriptors are processed and the event is moved, queue head pointer 102 must be updated to point to a next entry 106. Similarly, when queue head pointer 102 reaches the bottom of expired event queue 16, which is a circular list that wraps around from the bottom to the top, queue head pointer 102 must be updated or reset to the top entry of expired event queue 16, here entry 104. Such wrapping around expired event queue 16 is achieved using memory move operations.

The other four descriptors are responsible for preparing the DMA for moving events to the next entry in expired event queue 16. Referring once again to FIG. 4, these descriptors are third descriptor 86, fourth descriptor 88, fifth descriptor 90, and sixth descriptor 92 (also referred to as first setting descriptor, second setting descriptor, third setting descriptor, and fourth setting descriptor, respectively). As DMA 2 processes these descriptors, it modifies them with the aid of a wrap table 120, shown in FIG. 6, such that queue head pointer 102 wraps around expired event queue 16 and is updated to point to next entry 106. As such, these four descriptors form a configuration set of a plurality of descriptors for updating the queue head, based on the wrap table, to point to the next entry in the expired event queue.

The six descriptors are configured as depicted in FIG. 4. First descriptor 82 sets a destination field of second descriptor 84, depicted as "Desc2.dest", to point to current entry 104 in expired event queue 16 to which queue head pointer 102 is pointing, depicted as "&Queuehead". Second descriptor 84 transfers data, depicted as "&Data", to current entry 104. Third descriptor 86 sets a source field of sixth descriptor 92 to point to current entry 104 to which queue head pointer 102 is pointing. Fourth descriptor 88 modifies the source address of fifth descriptor 90 based on current entry 104 to which queue head pointer 102 is pointing. Fifth descriptor 90 modifies the source field of sixth descriptor 92, based on wrap table 120. Optionally, fifth descriptor 90 modifies the source field of sixth descriptor 92, based on wrap table 120, to point to a fourth field 108 in entry 104 of expired event queue 16, which contains the location of next entry 106. Alternatively, it modifies the source field of sixth descriptor 92 to point to another location in memory, such as a location in source memory 6 or destination memory 8, which contains the location of next entry 106. Sixth descriptor 92 sets queue head pointer 102 to point to next entry 106. Each descriptor is chained to the next descriptor to be processed. After processing sixth descriptor 92, DMA 2 would move to the next descriptor, depicted as "NextDesc.scr", which might be the first descriptor of another event or first maintenance descriptor 30.

Figure 6:
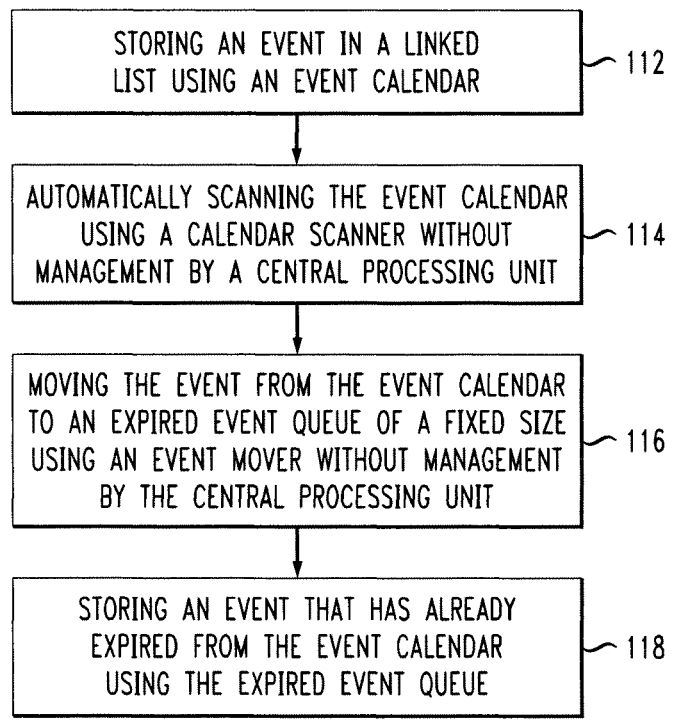
FIG. 6 depicts a flow chart of a method according to an aspect of the present invention.

FIG. 6 depicts a method of configuring a DMA according to another aspect of the present invention. At step 112, an event is stored in linked list 36 using event calendar 14. At step 116, event calendar 14 is automatically scanned using calendar scanner 17 without management by CPU 4. At step 118, an event is moved from event calendar 14 to expired event queue 16 using event mover 18 without management by CPU 4. At step 119, an event that has already expired from the event calendar is stored using expired event queue 16. Optionally, queue head pointer 102 is initialized.

An example follows, illustrating a single element being processed.

Suppose that the event has as its content a message stored in memory, and that this message is represented by the hexadecimal number 0x0123456789ABCDEF01234567:

Data: 0x01234567, 0x89ABCDEF, 0x01234567.

The queue head pointer may be initialized to point to the entry 104 located at the top of expired event queue 16 at address 0xF0000000:

QueueHead (@0xD0000000): 0xF0000000.

The expired event queue is initialized as shown in FIG. 5, so as to have fourth field 108 containing a location of next entries.

The event may be initalized as shown in FIG. 4.

First descriptor 82 sets the destination field of second descriptor 84 to point to the entry in expired event queue 16 to which queue head pointer 102 is pointing, which is current entry 104. Processing first descriptor 82 results in event 80 shown in FIG. 8.

Second descriptor 84 transfers data to current entry 104. Processing it results in expired event queue 16, shown storing data in FIG. 9.

As mentioned previously, the next four descriptors are used to set up DMA 2 for the next transfer of data. Expired event queue 16 is of a fixed size, such that wrapping is required when transferring to a next entry, even if the next entry is the last entry. These four descriptors coordinate wrapping using queue head pointer 102 and wrap table 120.

As mentioned, wrap table 120 optionally uses fourth field 108 of expired event queue 16 to locate next entry 106. Fourth field 108 may be used for instructing DMA 2 what entry to use next in expired event queue 16. The next entry in expired event queue 16 is at address 0xF0000010.

Queue head pointer 102 is used to keep track of the entry to which DMA 2 is transferring expired events.

Figure 10:
FIG. 10 is similar to FIG. 8 but depicting the event further in processing.

Third descriptor 86 sets the source field of sixth descriptor 92 to point to current entry 104 to which queue head pointer 102 is pointing. Processing third descriptor 86 results in event 80 shown in FIG. 10.

Figure 11:
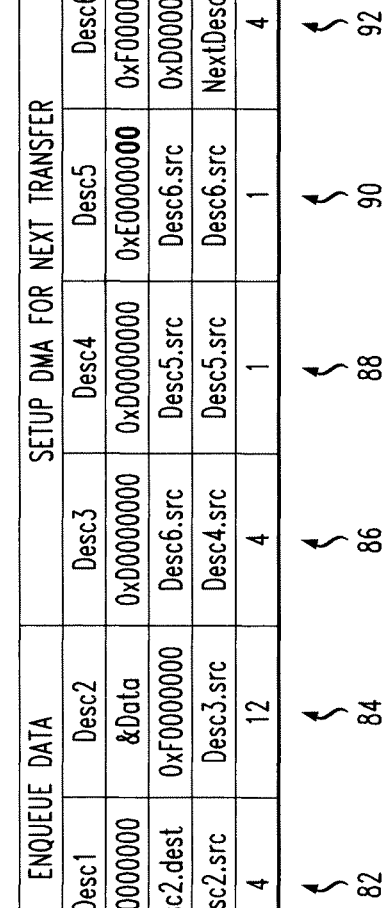
FIG. 11 is similar to FIG. 10 but depicting the event further in processing.

To use fourth field 108 of expired event queue 16, DMA 2 needs instructions on its exact address in memory, which in the present example is the entry to which queue head pointer 102 is pointing plus 0x0C. Since DMA 2 has no adding capabilities, memory move operations are used. Wrap table 120 provides a table of pre-calculated answers to the addition problem of the present example. To find the correct entry in wrap table 120, fourth descriptor 88 modifies the source address of fifth descriptor 90, which is a location in wrap table 120, based on current entry 104 to which queue head pointer 102 is pointing. Processing fourth descriptor 88 results in event 80 shown in FIG. 11.

Fifth descriptor 90 reads from wrap table 120 and updates the source field of sixth descriptor 92 to point at fourth field 108 of entry 104, which contains the address of next entry 106 at 0xF0000010. Processing fifth descriptor 90 results in event 80 shown in FIG. 12.

Finally, processing sixth descriptor 92 updates queue head pointer 102 to point to next entry 106:

QueueHead (@0xD0000000): 0xF0000010.

Thus, with six operations by DMA 2 configured according to an embodiment of the present invention, an event is added to expired event queue 16 without the involvement of CPU 4. As DMA 2 progresses through all of the events in event calendar 14, expired event queue 16 fills up with expired events and wraps around to the top.

To illustrate how DMA 2 wraps around to the top of expired event queue 16, another example is provided.

Suppose that queue head pointer is at the bottom of expired event queue 16, pointing to entry 109 at address 0xF0000070:
QueueHead (@0xD0000000): 0xF0000070.

Also suppose that the next event has a message represented by the hexadecimal number 0x1231231212312312312312312:
Data: 0x12312312, 0x12312312, 0x12312312.

Processing first descriptor 82 updates second descriptor 84 to point to the entry to which queue head pointer 102 is pointing, namely the entry located at 0xF0000070, as shown in FIG. 13.

Processing second descriptor 84 transfers data to entry 109, as shown in FIG. 14. For simplicity, any events that have been stored in expired event queue 16 between entries 104 and 109 have been omitted.

Processing third descriptor 86 updates sixth descriptor 92 to point to current entry 109 to which queue head pointer 102 is pointing, as shown in FIG. 15.

Processing fourth descriptor 88 updates fifth descriptor 90, based on current entry 109 to which queue head pointer 102 is pointing, as shown in FIG. 16.

Processing fifth descriptor 90 updates sixth descriptor 92 to point at fourth field 108 of entry 109, located at 0xF000007C, as shown in FIG. 17.

Finally, processing sixth descriptor 92 updates queue head pointer 102 to point to the next entry whose address is contained at 0xF000007C, which is next entry 104 located at 0xF0000000:
QueueHead (@0xD0000000): 0xF0000000.

Once moved to expired event queue 16, an expired event can be processed by CPU 4. DMA 2 moves events into expired event queue 16 asynchronously from CPU 4 which reads expired events from expired event queue 16. DMA 2 uses queue head pointer 102 to keep track of its position in expired event queue 16, while CPU 4 uses a tail pointer to keep track of its position in the queue. The tail pointer should not pass queue head pointer 102. CPU 4 reads events from expired event queue 16, processes them and then increments the tail pointer such that it points to the next event to be processed. Expired event queue 16 may be polled periodically for events that it needs to handle. This may be implemented using the software entity that provides the tail pointer. For example, the code that is used to handle a particular event could first poll an expired event queue specific to this code, collect all of the events that need to be handled and dispatch all of the events at once. This type of batch processing is much more efficient than processing single events at a time. Alternatively, adding an expired event to expired event queue 16 could generate an interrupt, using one or more descriptors, that wakes the software required to process the event.

If the type of event is modified to include a DMA write which initiates an interrupt, low latency event handlers can be constructed that also operate at high capacity.

As for the maintenance descriptors, in some embodiments first maintenance descriptor 30 is configured as shown in FIG. 18. It has a source address, which is configured to point to the address of the first descriptor of the first event of the next time slot; a destination address, which points to start pointer 32; a length field; and a next field, which points to the address of last maintenance descriptor 36.

Similarly, in some embodiments last maintenance descriptor 36 is configured as shown in FIG. 19. It may be static, having a source address, which is configured to point to the address of the first maintenance descriptor of the next time slot; a destination address, which points to the source address of the first maintenance descriptor of the current time slot; a length field; and a next field, which is set as a stop condition.

As mentioned, optionally event calendar 14 stores events in a linked list 24 indexed by time or time slots. The events do not, however, need to be indexed by time. As an alternative, the events may be controlled by external events and merely indexed by slots, such that external events trigger DMA 2 to proceed from one entry of a slot to another, or from one linked list of a slot to another. DMA 2 may support external control by other hardware devices which might be used to initiate the next entry or linked list. For example, a static or dynamic event may be implemented by a state machine such that an external piece of hardware would execute commands sent to it by DMA 2 and externally stimulate DMA 2 to proceed with the next entry or linked list.

Referring to FIG. 1, in another aspect of the present invention, there is provided a system for timing events comprising DMA 2 coupled to CPU 4. The CPU 4 is configured to perform the steps identified in the method depicted in the flow chart of FIG. 6. CPU 4 writes to memory locations, including those implemented within DMA 2, so as to control the operation of DMA 2.

In yet another aspect of the present invention, there is provided a computer readable medium on which is stored a set of instructions for timing events, which when executed performs the steps which, again, are identified in the method shown in FIG. 6. The computer readable medium may be stored on a memory storage device, such as a hard disc device, an IC (Integrated Circuit) memory, a magnetic disc device, an optical disc device or the like.

One of the advantages of the present invention is that it provides general purpose operating systems, such as Windows™ or Linux™, hard real-time capabilities. It also completely eliminates the CPU cost of maintaining a timer system, which may result in a significant performance improvement.

What has been described is merely illustrative of the application of the principles of the invention. Other arrangements and methods can be implemented by those skilled in the art without departing from the spirit and scope of the present invention.

We claim:

1. A direct memory access device for timing events comprising:
an event calendar for storing an event in a linked list;
an expired event queue of a fixed size for storing an event that has already expired from the event calendar;
a calendar scanner for automatically scanning the event calendar without management by a central processing unit; and
an event mover for moving the event from the event calendar to the expired event queue without management by the central processing unit.

2. The direct memory access device of claim 1, wherein the calendar scanner comprises:
a start pointer for pointing to a first event in a linked list of a next slot;
a first maintenance descriptor for updating the start pointer to point to the first event in the linked list of the next slot; and
a last maintenance descriptor for erasing the event that has already expired from the event calendar.

3. The direct memory access device of claim 1, wherein the event mover comprises:
a queue head pointer for pointing to a current entry in the expired event queue in which can be stored the event that has already expired from the event calendar;
a wrap table for locating the next entry in the expired event queue; and the event comprising a plurality of chained descriptors
comprising:
a moving set of at least one descriptor for moving the event that has already expired from the event calendar to the current entry in the expired event queue, and
a configuration set of a plurality of descriptors for updating the queue head pointer to point to the next entry in the expired event queue.

4. The direct memory access device of claim 2, wherein the event mover comprises:
a queue head pointer for pointing to a current entry in the expired event queue in which can be stored the event that has already expired from the event calendar;
a wrap table for locating the next entry in the expired event queue; and
the event comprising a plurality of chained descriptors comprising:
a moving set of at least one descriptor for moving the event that has already expired from the event calendar to the current entry in the expired event queue, and
a configuration set of a plurality of descriptors for updating the queue head pointer to point to the next entry in the expired event queue.

5. The direct memory access device of claim 4, wherein the moving set comprises:
a first descriptor, and
a second descriptor;
whereby the first descriptor sets a destination field of the second descriptor to point to the current entry in the expired event queue to which the queue head pointer is pointing, and
the second descriptor transfers data to the current entry.

6. The direct memory access device of claim 4, wherein the configuration set comprises:
a first setting descriptor,
a second setting descriptor,
a third setting descriptor, and
a fourth setting descriptor;
whereby the first setting descriptor sets a source field of the fourth setting descriptor to point to the current entry to which the queue head pointer is pointing,
the second setting descriptor modifies the source address of the third setting descriptor based on the current entry to which the queue head pointer is pointing,
the third setting descriptor modifies the source field of the fourth setting descriptor, based on the wrap table, and
the fourth setting descriptor sets the queue head pointer to point to the next entry in the expired event queue.

7. The direct memory access device of claim 5, wherein the configuration set comprises:
a first setting descriptor,
a second setting descriptor,
a third setting descriptor, and
a fourth setting descriptor;
whereby the first setting descriptor sets a source field of the fourth setting descriptor to point to the current entry to which the queue head pointer is pointing,
the second setting descriptor modifies the source address of the third setting descriptor based on the current entry to which the queue head pointer is pointing,
the third setting descriptor modifies the source field of the fourth setting descriptor, based on the wrap table, and
the fourth setting descriptor sets the queue head pointer to point to the next entry in the expired event queue.

8. A method of configuring a direct memory access device for timing events comprising:
storing an event in a linked list using an event calendar;
automatically scanning the event calendar using a calendar scanner without management by a central processing unit;
moving the event from the event calendar to an expired event queue of a fixed size using an event mover without management by the central processing unit; and
storing an event that has already expired from the event calendar using the expired event queue.

9. The method of claim 8, wherein automatically scanning the event calendar comprises:
pointing to a first event in a linked list of a next slot using a start pointer;
updating the start pointer to point to the first event in the linked list of the next slot; and
erasing the event that has already expired from the event calendar.

10. The method of claim 8, wherein moving the event comprises:
pointing, using a queue head pointer, to a current entry in the expired event queue in which can be stored the event that has already expired from the event calendar;
locating the next entry in the expired event queue using a wrap table; and
configuring the event to comprise a plurality of chained descriptors for:
moving the event that has already expired from the event calendar to the current entry in the expired event queue using at least one descriptor, and
updating the queue head pointer to point to the next entry in the expired event queue using a plurality of descriptors.

11. The method of claim 9, wherein moving the event comprises:
pointing, using a queue head pointer, to a current entry in the expired event queue in which can be stored the event that has already expired from the event calendar;
locating the next entry in the expired event queue using a wrap table; and
configuring the event to comprise a plurality of chained descriptors for:
moving the event that has already expired from the event calendar to the current entry in the expired event queue using at least one descriptor, and
updating the queue head pointer to point to the next entry in the expired event queue using a first updating descriptor, a second updating descriptor, a third updating descriptor, and a fourth updating descriptor;
wherein updating the queue head pointer comprises:
setting, using a first setting descriptor, a source field of a fourth setting descriptor to point to the current entry to which the queue head pointer is pointing,
modifying, using a second setting descriptor, the source address of a third setting descriptor based on the current entry to which the queue head pointer is pointing,
modifying, using the third setting descriptor, the source field of the fourth setting descriptor, based on the wrap table, and
setting, using the fourth setting descriptor, the queue head pointer to point to the next entry in the expired event queue.

12. A system for timing events comprising a direct memory access device coupled to a central processing unit, the central processing unit configured to program the direct memory access device to perform a method comprising:
storing an event in a linked list using an event calendar;
automatically scanning the event calendar using a calendar scanner without management by the central processing unit;

moving an event from the event calendar to an expired event queue of a fixed size using an event mover without management by the central processing unit; and storing an event that has already expired from the event calendar using the expired event queue.

13. The system of claim 12, wherein automatically scanning the event calendar comprises:

pointing to a first event in a linked list of a next slot using a start pointer;

updating the start pointer to point to the first event in the linked list of the next slot; and erasing the event that has already expired from the event calendar.

14. The system of claim 12, wherein moving the event comprises:

pointing, using a queue head pointer, to a current entry in the expired event queue in which can be stored the event that has already expired from the event calendar;

locating the next entry in the expired event queue using a wrap table; and configuring the event to comprise a plurality of chained descriptors for:

moving the event that has already expired from the event calendar to the current entry in the expired event queue using at least one descriptor, and updating the queue head pointer to point to the next entry in the expired event queue using a plurality of descriptors.

15. The system of claim 13, wherein moving the event comprises:

pointing, using a queue head pointer, to a current entry in the expired event queue in which can be stored the event that has already expired from the event calendar;

locating the next entry in the expired event queue using a wrap table; and configuring the event to comprise a plurality of chained descriptors for:

moving the event that has already expired from the event calendar to the current entry in the expired event queue using at least one descriptor, and updating the queue head pointer to point to the next entry in the expired event queue using a first updating descriptor, a second updating descriptor, a third updating descriptor, and a fourth updating descriptor;

wherein updating the queue head pointer comprises:

setting, using a first setting descriptor, a source field of a fourth setting descriptor to point to the current entry to which the queue head pointer is pointing, modifying, using a second setting descriptor, the source address of a third setting descriptor based on the current entry to which the queue head pointer is pointing, modifying, using the third setting descriptor, the source field of the fourth setting descriptor, based on the wrap table, and setting, using the fourth setting descriptor, the queue head pointer to point to the next entry in the expired event queue.

16. A non-transitory computer readable medium on which is stored a set of instructions for timing events, which when executed configures a direct memory access device to performs a method comprising:

storing an event in a linked list using an event calendar;

automatically scanning the event calendar using a calendar scanner without management by the central processing unit;

moving an event from the event calendar to an expired event queue of a fixed size using an event mover without management by the central processing unit; and storing an event that has already expired from the event calendar using the expired event queue.

17. The computer readable medium of claim 16, wherein automatically scanning the event calendar comprises:

pointing to a first event in a linked list of a next slot using a start pointer;

updating the start pointer to point to the first event in the linked list of the next slot; and erasing the event that has already expired from the event calendar.

18. The computer readable medium of claim 16, wherein moving the event comprises:

pointing, using a queue head pointer, to a current entry in the expired event queue in which can be stored the event that has already expired from the event calendar;

locating the next entry in the expired event queue using a wrap table; and configuring the event to comprise a plurality of chained descriptors for:

moving the event that has already expired from the event calendar to the current entry in the expired event queue using at least one descriptor, and updating the queue head pointer to point to the next entry in the expired event queue using a plurality of descriptors.

19. The computer readable medium of claim 17, wherein moving the event comprises:

pointing, using a queue head pointer, to a current entry in the expired event queue in which can be stored the event that has already expired from the event calendar;

locating the next entry in the expired event queue using a wrap table; and configuring the event to comprise a plurality of chained descriptors for:

moving the event that has already expired from the event calendar to the current entry in the expired event queue using at least one descriptor, and updating the queue head pointer to point to the next entry in the expired event queue using a first updating descriptor, a second updating descriptor, a third updating descriptor, and a fourth updating descriptor;

wherein updating the queue head pointer comprises:

setting, using a first setting descriptor, a source field of a fourth setting descriptor to point to the current entry to which the queue head pointer is pointing, modifying, using a second setting descriptor, the source address of a third setting descriptor based on the current entry to which the queue head pointer is pointing, modifying, using the third setting descriptor, the source field of the fourth setting descriptor, based on the wrap table, and setting, using the fourth setting descriptor, the queue head pointer to point to the next entry in the expired event queue.

* * * * *